April 22, 1969   M. LUDEWIG ET AL   3,439,924

SEAL FOR A ROTATABLE SHAFT HAVING A SEGMENTED SEALING RING

Filed July 1, 1966

Inventors:
Max Ludewig
Walter Zörner
Elmar Tonn

By: Spencer & Kaye
Attorneys

United States Patent Office 3,439,924
Patented Apr. 22, 1969

3,439,924
SEAL FOR A ROTATABLE SHAFT HAVING A SEGMENTED SEALING RING
Max Ludewig, Walter Zörner and Elmar Tonn, Berlin, Germany, assignors, by mesne assignments, to Halberg Maschinenbau G.m.b.H. & Co., Ludwigshafen (Rhine), Germany
Filed July 1, 1966, Ser. No. 562,276
Claims priority, application Germany, July 1, 1965, L 51,008
Int. Cl. F16j 15/16, 15/34, 15/54
U.S. Cl. 277—137                 8 Claims

ABSTRACT OF THE DISCLOSURE

A floating ring seal for sealing fluids between an area of higher pressure and an area of lower pressure about a rotatable shaft. The seal includes a seal housing and a sealing body supported by the housing, which surrounds the shaft and forms an axially extending sealing gap therewith. The sealing body includes an undivided supporting ring and a subdivided or segmented floating ring. The floating ring is made with a U-shaped cross section so as to surround the supporting ring; the inner surfaces of the base and the outer leg of the U-shaped cross section are so adapted to the corresponding surfaces of the supporting ring that the floating ring is precisely positioned with respect to the supporting ring. A spring or springs disposed between the inner surface of the supporting ring and the inner leg of the U-shaped cross section of the floating ring also aid in centering the floating ring. The entire sealing body is supported by the seal housing by a number of radially extending resilient elements which secure the supporting ring to the housing.

---

The present invention relates generally to the sealing art, and, more particularly, to a floating ring joint or seal or circumferential joint for sealing fluids in rotating shafts.

Floating ring or circumferential seals are contact-free shaft packings. If it is required that the amount of leakage flowing through the gap of the packing be small, then the radial clearance or play must be correspondingly small. In order to assure that such a device can be constructed having small play, it is necessary to exactly center the floating ring of a seal for horizontally disposed machines. In machines which are arranged vertically the centering of the rings is not required since in these mechanisms the ring is automatically centered during starting of the machine by the leakage flow. In the previously constructed horizontally arranged machines centering is provided by way of O-shaped rings. However, this type of centering is not exact and the small amount of play which is provided because of the influence of weight on a floating ring will produce a deformation of the O-shaped ring and thus an eccentricity. Because of this eccentricity, when the gap is small a brushing or touching of the shaft and floating ring may take place during the start of the machine since only small centering forces are produced at that time due to the relatively small leakage flow or current, which will not center the ring. Because of heat conduction the ring may be deformed so as to assume an oval shape and this will cause damage to the joint. Because of the only relatively accurate centering by means of the O-shaped rings and the added radial play which is required for safety reasons and which has to be provided because of the brushing or touching which takes place, the result is that because of this play larger amounts of leakage can take place.

With this in mind it is a primary object of the present invention to overcome the defects of the prior art.

Another object of the present invention is to provide a floating ring seal or joint having a small play and small forces of reaction acting upon the shaft.

A further object of the invention is to provide a seal or joint of the character described which while performing the above simultaneously effectively prevents the ring from being deformed into an oval shape and the joint from being destroyed which happens when there is a brushing or contacting taking place.

These objects and others ancillary thereto are accomplished in accordance with preferred embodiments of the invention wherein a floating ring is slipped onto one or several undivided supporting rings and the floating ring is subdivided into segments. The floating ring has outer radial contact surfaces which are common to the supporting ring and these are so adapted to each other that they provide a precise concentric positioning of the floating ring with respect to the supporting ring. A spring is disposed between the radially inner contact surfaces for aiding the centering operation and several resilient supporting or fixing elements are provided for fixing the entire seal or joint. These resilient elements are secured with the radially outer ends in the housing which encloses this seal and with their radially inner ends disposed in grooves in the supporting ring.

Additional objects and advantages of the present invention will become apparent upon consideration of the following description when taken in conjunction with the accompanying drawings in which.

Figure 1:
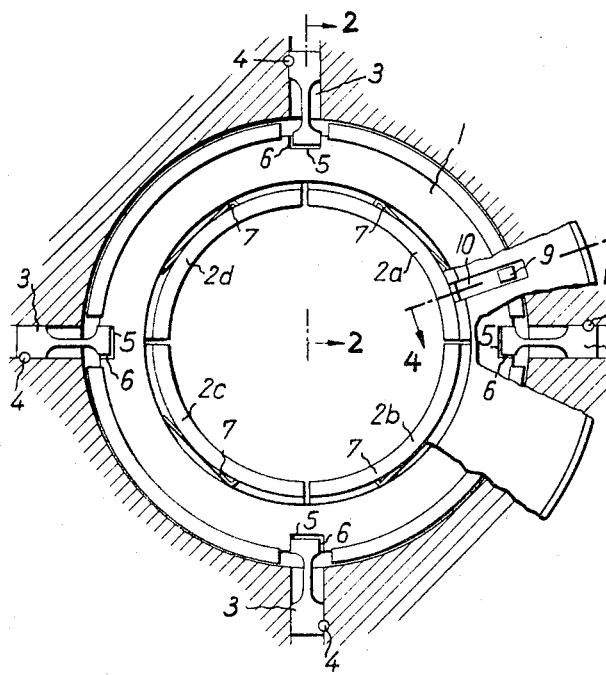
FIGURE 1 is a schematic side view partly in section of the floating ring seal of the present invention.
Figure 2:
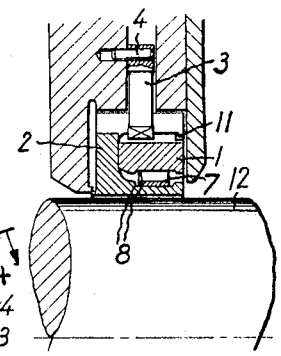
FIGURE 2 is a cross-sectional view taken substantially along the plane defined by reference line 2—2 of FIGURE 1.

With more particular reference to the drawings, the segmented floating ring 2 is slipped onto the supporting ring 1. This floating ring 2 is constructed of segments 2a through 2d. The support ring 1 together with the floating ring 2 is held in position in radial direction by means of the support springs 3. These support springs 3 are secured at the radially outer ends thereof in the housing which encloses the seal by means of set pins 4. The support springs 3 have their radially inner ends disposed in grooves 5 which are formed in the outer circumference of the supporting ring 1. There is a certain amount of play 6 provided between the supporting springs 3 and the grooves 5 in the circumferential direction of the ring. Those supporting springs which are disposed opposite each other in the vertical direction have play on opposite sides and this assures that there can not be a lateral displacement of the entire seal.

In order to increase the contact or pressure of the floating ring segments on the supporting ring a plurality of springs 7 is provided and these are disposed between the supporting ring and the floating ring and are held in position against slipping out laterally by means of a circumferential groove 8. In order to absorb any circumferential forces which arise such as those which might be caused by a brushing or contacting of the shaft against the floating ring, a spring or pin 9 is provided which is slid in a milled opening 10 within the housing into a groove disposed at the floating ring. The working medium which is required in order to build up pressure within the space between the seal and the surrounding housing may simultaneously enter through this opening 10. A projecting portion 11 is provided at the floating ring and extends in the circumferential direction in order to prevent a mutual axial slippage of the rings during the time that they are assembled. A portion of the rotating shaft 12 is shown in the drawing.

Figure 4:
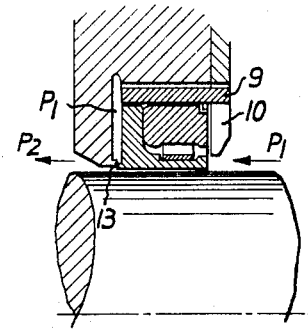
FIGURE 4 is a cross-sectional view taken substantially along the plane defined by reference line 4—4 of FIGURE 1.

The arrangement of the spring 9 which is operating as an arresting device is shown more clearly in FIGURE 4. $P_1$ and $P_2$ indicate the pressure of the working medium and the fluid flow is designated by means of arrows. The fluid enters through the opening 10 and builds up the pressure $P_1$ within the space between the seal and the surrounding housing. In the gap between the floating ring 2 and the rotating shaft 12 a pressure drop occurs from the high pressure $P_1$, for example 40 ata. to the low pressure $P_2$, for example 1 ata., where "ata." is absolute pressure in atmospheres.

The pressure difference between the right and the left flank of the floating ring 2 presses the floating ring 2 onto the housing so that the resulting packing surface 13 seals the space with pressure $P_1$ against the space with pressure $P_2$.

The hydrodynamic centering forces which cause the floating ring 2 to move radially are greater than the weight of the seal, the spring forces of the springs 3 and the resistance force from the friction in the packing surface 13 due ot the axial contact pressure and the coefficient of friction.

Figure 3:
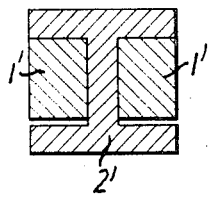
FIGURE 3 is an enlarged fragmentary cross-sectional view of another embodiment of the invention.

FIGURE 3 shows a modified embodiment in which the supporting ring can be provided in the form of two discs 1' in which case the floating ring 2' has a double T-shaped cross section.

It can thus be seen that in order to provide the supporting or fixing elements flat or leaf-type springs are provided which are secured in the radially outer part of the supporting ring and within the housing by means of fixing pins. These leaf springs are of such a construction that under the influence of weight they only slightly deflect with respect to the radial gap. On the other hand they will yield to hydrodynamic centering forces which are considerably greater than the weight and spring forces as well as the resistance force from the axial frictional force, and therefore these springs render it possible for the floating ring to move radially under small hydrodynamic forces. In order to support the floating ring in its position when circumferential forces occur, for example those which occur when the shaft touches against the ring, and in order to prevent the fixing elements from being unduly stressed, a spring is disposed in a groove of the floating ring. A milled opening is provided in the housing which encloses the seal and this opening accommodates the spring. The opening is so large in the radial direction that the amount of leakage flowing through the gap formed by the surfaces of the individual segments will not cause a pressure drop in the space radially outside of the segments. The gap between the inner contour of the housing which encloses the floating ring and the outer contour of the floating ring is so proportioned that during the deflection of the segments the supporting elements will also not be overly stressed.

The springs which are disposed between the inner contact surfaces of the floating ring and the supporting ring may be leaf springs which rest in a circumferential groove as a precautionary measure to prevent them from slipping out laterally. The surfaces of the floating ring are designed to provide that the pressure difference between the pressures which act upon the outer and the inner peripheral areas will press the floating ring onto the supporting ring at all times. Play is provided between the walls of the groove and the radially inner end of the supporting springs not only in the radial but also in the circumferential direction. This play is provided in the vertically disposed supporting springs but on opposite sides thereof. The supporting ring is constructed so that the forces acting upon the seal only cause a small deformation of the supporting ring and this deformation is sufficiently small that the gap between the end faces of the individual floating ring segments is maintained. This assures that the segments will rest upon the supporting ring at all times and will not mutually support each other at the end faces. Because the floating ring segments are pressed onto the supporting ring in each operating condition of the seal this assures that in the event there is an eccentricity between the rotating shaft and the floating ring outer contour, the supporting ring together with the floating ring segments will be displaced against the weight and spring and axial frictional forces and thus always remain one unit. If the floating ring segments were mutually supported at their end faces the segments, due to the action of the hydrodynamic centering force, would seek to give way radially.

However, since the force from the pressure differences acting radially inwardly from the outside is greater such a deflection of the segments could not be produced. However, this in turn would produce undesirably large forces of reaction which act upon the shaft.

Thus, a particular advantage of the present invention is that no noticeable forces of reaction originating from eccentrically act upon the shaft, and this assures quiet operation of the shaft.

Because the floating ring is subdivided into individual segments the seal can not be deformed into an oval shape during the time that brushing or touching between the shaft and the elements takes places and when heat is generated. Because of the exact centering of the seal as well as the resiliency of the supporting elements and the greatest possible pressure relief in the radial direction, only small forces are required in the radial direction as compared to the hydrodynamic centering force in order to center the ring in case of any possible eccentricities. As a result a smaller radial play for the floating ring may be provided as compared to constructions known previously.

For example a radial play of $15/100$ mm. may be provided wherein a deformation of the supporting ring of $2/100$–$3/100$ mm. is allowable. The supporting ring is constructed as a compact ring of chrome steel.

It will be understood that the above description of the present invention is susceptible to various modifications, changes and adaptations and the same are intended to be comprehended within the meaning and range of equivalents of the appended claims.

What is claimed is:
1. A floating ring seal for sealing fluids between an area of higher pressure and an area of lower pressure about a rotatable shaft comprising, in combination:
  (a) sealing means for surrounding the shaft and for forming an axially extending sealing gap between such shaft and said sealing means, said sealing means having a radially extending first contact surface, and
  (b) housing means, surrounding said sealing means, for supporting said sealing means, said housing means having an axially extending opening and a radially extending second contact surface arranged to abut said first contact surface to prevent the flow of fluid between said sealing means and said housing means, wherein said sealing means includes:
    (1) an undivided supporting ring, the solid portion of which is of substantially rectangular cross section, said supporting ring having a first annular groove extending around its outer circumference at one of its corners, a second annular groove extending around its inner circumferential surface, and a plurality of first axially extending grooves arranged around its outer circumferential surface;
    (2) a floating ring subdivided into a plurality of of segments, and having a U-shaped cross section that opens toward the side of said sealing means formed by that lateral side of said supporting ring having said one corner at the outer circumference therof, said U-shaped cross section surrounding said supporting ring with surfaces arranged to match the outer circumferential and the other lateral surface of said supporting ring and that is partially closed by an annular projection on the outer leg thereof extending radially inward from said outer leg and arranged to engage in said first annular groove to clamp said supporting ring, said floating ring having a plurality of second axially extending grooves arranged around its outer circumferential surface at the points of separation between said plurality of segments, said points being arranged at the locations of said first axially extending grooves, said second axially extending grooves being wider than said first axially extending grooves, having a third axially extending groove arranged at an arbitrary point on its outer circumferential surface, and having a third annular groove extending around the circumferential surface on the inside of said U-shaped cross section on the inner leg thereof;

(3) a plurality of resilient supporting means for centering said supporting ring, said resilient supporting means having one end connected to said housing means and an opposite end extending into one of said first axially extending grooves through one of said second axially extending grooves without contacting said floating ring;

(4) at least one spring means disposed between said supporting ring and said floating ring in said second and third annular grooves for holding said floating ring with respect to said supporting ring; and (5) pin means, extending through said opening in said housing means and said third axially extending groove in said floating ring, for preventing the rotation of said floating ring upon rotation of such shaft.

2. A seal as defined in claim 1 wherein said supporting means are leaf-type springs held in their radially outer ends within said housing means by means of pins.

3. A seal as defined in claim 1 wherein said floating ring is provided with means defined by the surfaces thereof for providing a pressure difference between the pressures acting upon the outer and upon the inner circumferential surfaces for pressing the floating ring onto the supporting ring at all times.

4. A seal as defined in claim 1 wherein said opening in said housing means for accommodating said pin means is sufficiently large that the amount of leakage flowing through the gap surfaces of the individual segments of said floating ring will not provide a pressure drop within the space radially outside of the segments.

5. A seal as defined in claim 1 wherein there is play between said supporting means and the walls of said first axially extending grooves in said supporting ring, this play being in the circumferential direction and being oppositely disposed in the supporting means which are opposite each other in a vertical direction.

6. A seal as defined in claim 5 wherein the inner walls of said housing means are dimensioned to limit the maximum movement of said sealing means.

7. A seal as defined in claim 1 wherein the supporting ring is strongly constructed so that only a small deformation of the supporting ring takes place due to the resulting pressure force acting upon said sealing means so that the gaps between the end faces of the individual floating ring segments are maintained.

8. A seal as defined in claim 1, wherein the inner walls of said housing means and the outer circumferential surface of said floating ring define a radial gap when said floating ring is centered in said housing means and said supporting means are dimensioned so that they permit a deflection of said floating ring into said radial gap, due to the weight of said sealing means, which does not exceed one tenth of the width of said radial gap, and without permanent deformation permit a deflection of said floating ring into said radial gap equal to the width of said gap.

References Cited

UNITED STATES PATENTS

| 2,153,025 | 4/1939 | Rais | 277—160 X |
| 2,867,458 | 1/1959 | Kroekel | 277—149 X |
| 2,888,286 | 5/1959 | Scheffler et al. | 277—154 X |
| 3,309,095 | 3/1967 | Gate et al. | 277—154 |

FOREIGN PATENTS

| 657,186 | 2/1963 | Canada. |

SAMUEL ROTHBERG, *Primary Examiner.*

J. S. MEDNICK, *Assistant Examiner.*

U.S. Cl. X.R.

277—150, 154, 194